UNITED STATES PATENT OFFICE.

FRANCIS L. STEWART, OF MURRYSVILLE, PENNSYLVANIA, ASSIGNOR TO MAIZE SUGAR & CELLULOSE COMPANY, OF PITTSBURGH, PENNSYLVANIA, A CORPORATION OF SOUTH DAKOTA.

MANUFACTURE OF CELLULOSE.

1,017,023.      Specification of Letters Patent.      Patented Feb. 13, 1912.

No Drawing.      Application filed November 11, 1908.   Serial No. 462,119.

*To all whom it may concern:*

Be it known that I, FRANCIS L. STEWART, residing at Murrysville, in the county of Westmoreland and State of Pennsylvania, have invented a new and useful Improvement in the Manufacture of Cellulose, of which the following is a full, clear, and exact description.

My invention has relation to a novel process for producing pure cellulose from the fiber and cellular matter of maize (or the Indian corn plant) and more particularly to the fiber and cellular matter from maize which has been treated in the manner described and claimed in my Patents Nos. 811,523 and 811,524, dated January 30th, 1906, and is designed to provide a process by which such cellulose and its solutions may be obtained from this peculiar stalk material after the saccharine and other soluble matter has been removed by the operation of a sugar mill or other extraction process. This fibrous and cellular matter after being first thoroughly ground and disintegrated is reduced to the condition of a fine bleached pulp, this being preferably accomplished by a pulping process such as described in Letters Patent of the United States granted to me on February 26, 1907, Number 845,378. In accordance with my invention, this pulp after being thoroughly washed and the water drained off, pressed out, or otherwise removed, may be taken either in the dry or moist condition, and a saturated solution of chlorinated lime in water poured upon it and mixed with it in such proportions as to thoroughly wet the pulp and expose every part of it to the action of the liquid. It is then allowed to remain in that condition in a closely covered wooden tank for a period of from ten to forty-eight hours, the length of time required being dependent upon the more or less thorough prior disintegration of the fibrous substance of the pulp. The material is then emptied into a lead or porcelain lined digester or other suitable vessel, capable of being made air-tight, and which is fitted with a revolving mixer and feed pipe or other suitable device, and diluted hydrochloric acid is gradually added to it and well mixed with it in small quantities at a time until, as ascertained by a test pipe, it is seen that the pulp has a strong acid reaction to litmus paper. The material should then be allowed to remain at rest for a period of from twelve to forty-eight hours, after which it is thoroughly washed and dried. This intermediate treatment is necessary in order to prepare the pulp for solution in conjunction with subsequent nitration. This nitration is preferably accomplished in the following manner. A mixture of sulfuric and nitric acids of the ordinary commercial strength is prepared and is cooled after mixing, to a temperature of about forty degrees and in no case above sixty degrees F. I find that a mixture containing about two parts by volume of sulfuric acid to one part by volume of nitric acid is a satisfactory one for the purpose, although I do not limit myself to these proportions. The prepared pulp dried in as loose and flacculent condition as possible is then stirred into the acid mixture in small portions at a time, the temperature being kept down by artificial cooling to sixty degrees F. or less, until nearly all the acid liquid has been absorbed by the pulp. The mixture should then be allowed to remain at rest in a covered vessel for from ten to fifteen hours. It is then washed with water as long as litmus paper shows any trace of acid, after which it is dried on a hot water bath at an open air temperature, preferably of about eighty degrees F.

The pyroxylin resulting from the process described dissolves in ether-alcohol, acetone, acetic-ether and other solvents with extreme facility, forming a solution at a very low cost, which when denitrated by any of the ordinary processes is suitable for the production of artificial silk, collodion, etc.; and also in the form of pure precipitated cellulose for the manufacture of smokeless powder and for all the other uses in the arts for which pure cellulose is required.

The physical condition of the fibrous material of maize when grown and developed under the special conditions described in my said Patents Nos. 811,523 and 811,524 cause it to possess peculiar resistance to perfect nitration, since such treatment is efficacious, not only in producing an abnormal accumulation of sugar in the juice of the stalk, but also produces a new condition of the substance of the stalk itself. By this method, I am enabled to form pure cellulose solutions from the waste or by-product obtained after the saccharine and other soluble matter has been removed from the stalks. By the use of such material treated in this manner, I am able to very greatly reduce the cost of pure cellulose and cellulose solutions.

Instead of using the preliminary pulping process described in my said Patent Number 845,378, any other suitable process of producing fine bleached pulp may be employed.

Various other changes may be made in the details of the process, in the temperatures and proportions employed, and in the apparatus by means of which the process is carried out, the method above described being, however, that which I have found in practice to give most satisfactory results.

I claim:

1. In the manufacture of cellulose, the method which consists in first obtaining a fine bleached pulp from the fiber and cellular matter of maize, and then treating the pulp with chlorinated lime and hydrochloric acid; substantially as described.

2. In the manufacture of cellulose, the method which consists in treating immature maize to reduce its fiber and cellular matter to the form of a fine bleached pulp, then treating such pulp with chlorinated lime and hydrochloric acid, for the purpose of removing impurities which would otherwise hinder the material, after subsequent nitration, from dissolving in the ordinary solvents; substantially as described.

3. In the manufacture of cellulose for nitration, the step which consists in taking a fine bleached pulp produced from the fiber and cellular matter of maize, and treating the same with chlorinated lime and hydrochloric acid; substantially as described.

In testimony whereof, I have hereunto set my hand.

FRANCIS L. STEWART.

Witnesses:
SAML. E. GILL,
WM. H. WILKENING.